(12) United States Patent
Shin et al.

(10) Patent No.: US 8,580,143 B2
(45) Date of Patent: Nov. 12, 2013

(54) LYOTROPIC CHROMONIC LIQUID CRYSTAL COMPOSITION, METHOD FOR MANUFACTURE OF LYOTROPIC CHROMONIC LIQUID CRYSTAL COATING FILM, AND LYOTROPIC CHROMONIC LIQUID CRYSTAL COATING FILM MANUFACTURED THEREBY

(75) Inventors: Seung Han Shin, Seoul (KR); Eu Gene Chang, Daejeon (KR); Myong Hoon Lee, Jeollabuk-do (KR); Kwang Un Jeong, Jeollabuk-do (KR); Yun Ju Bae, Cungcheongnam-do (KR)

(73) Assignees: Korea Institute of Industrial Technology, Chungcheongnam-do (KR); Industrial Cooperation Foundation Chonbuk National University, Jeollabuk-do (KR)

( * ) Notice: Subject to any disclaimer, the term of this patent is extended or adjusted under 35 U.S.C. 154(b) by 13 days.

(21) Appl. No.: 13/127,940

(22) PCT Filed: Nov. 5, 2009

(86) PCT No.: PCT/KR2009/006474
§ 371 (c)(1),
(2), (4) Date: Jun. 24, 2011

(87) PCT Pub. No.: WO2010/053298
PCT Pub. Date: May 14, 2010

(65) Prior Publication Data
US 2011/0272629 A1   Nov. 10, 2011

(30) Foreign Application Priority Data

Nov. 5, 2008  (KR) .................. 10-2008-0109205
Nov. 5, 2008  (KR) .................. 10-2008-0109207
Nov. 5, 2008  (KR) .................. 10-2008-0109208

(51) Int. Cl.
*C09K 19/38* (2006.01)
*C09K 19/30* (2006.01)
*C09K 19/54* (2006.01)
*C09K 19/32* (2006.01)
*C09K 19/20* (2006.01)
*B05D 5/06* (2006.01)
*C08F 20/34* (2006.01)

(52) U.S. Cl.
USPC ............. 252/299.01; 252/299.5; 252/299.61; 252/299.62; 252/299.67; 427/162; 427/508; 427/520; 427/521; 522/173; 522/182

(58) Field of Classification Search
USPC ............... 428/1.1; 252/299.01, 299.5, 299.6, 252/299.61, 299.62, 299.67; 427/162, 520, 427/521, 508; 522/173, 182
See application file for complete search history.

(56) References Cited

U.S. PATENT DOCUMENTS 5,911,911 A   6/1999  Keller et al.
5,948,487 A   9/1999  Sahouani et al.
(Continued)

FOREIGN PATENT DOCUMENTS

JP   56139506 A   10/1981
JP   61267702 A   11/1986
JP   64500127 A    1/1989
JP    1025365 A    1/1998
(Continued)

*Primary Examiner* — Shean C Wu
(74) *Attorney, Agent, or Firm* — Workman Nydegger

(57) ABSTRACT

The present invention relates to a lyotropic chromonic liquid crystal composition, a method for manufacturing a lyotropic chromonic liquid crystal coating film and a lyotropic chromonic liquid crystal coating film manufactured thereby. The lyotropic chromonic liquid crystal composition of the present invention includes chromonic liquid crystal compounds and monomers each having opposing acid-base properties. Use of the lyotropic chromonic liquid crystal composition in the formation of optical films leads to improvements in electrical and optical properties such as mechanical strength, an insulating characteristic and a refractive index.

20 Claims, 7 Drawing Sheets

(56) References Cited

U.S. PATENT DOCUMENTS

| | | | |
|---|---|---|---|
| 6,051,290 A | 4/2000 | Sahouani et al. | |
| 6,221,150 B1 | 4/2001 | Weber et al. | |
| 2002/0066885 A1 | 6/2002 | Sahouani et al. | |
| 2002/0168511 A1 | 11/2002 | Schneider et al. | |
| 2004/0141121 A1 | 7/2004 | Tanaka et al. | |
| 2004/0215015 A1 | 10/2004 | Nazarov et al. | |
| 2005/0286128 A1 | 12/2005 | Lazarev et al. | |
| 2006/0040069 A1* | 2/2006 | Lavretovich et al. | 428/1.2 |
| 2006/0194927 A1* | 8/2006 | Gin et al. | 525/330.7 |
| 2011/0013124 A1* | 1/2011 | Wang et al. | 349/96 |
| 2011/0317102 A1* | 12/2011 | Ramirez et al. | 349/96 |

FOREIGN PATENT DOCUMENTS

| | | |
|---|---|---|
| JP | 11286489 A | 10/1999 |
| JP | 2000147258 A | 5/2000 |
| JP | 2000226581 A | 8/2000 |
| JP | 2001515945 A | 9/2001 |
| JP | 2002294239 A | 10/2002 |
| JP | 2002296415 A | 10/2002 |
| JP | 2004514781 A | 5/2004 |
| JP | 2006526013 A | 11/2006 |
| JP | 2007169585 A | 7/2007 |
| JP | 2007241037 A | 9/2007 |
| WO | 02093213 | 11/2002 |

* cited by examiner

| Surfaces Observed With Pencil Hardness Increasing |||||||
|---|---|---|---|---|---|---|
| Example 1 | Surface |  |  |  |  |  |
|  | Pencil Hardness | HB | F | H | 2H | 3H |
| Comparative Example 1 | Surface Image |  |  |  |  |  |
|  | Pencil Hardness | 6B | 5B | 4B | 3B | 2B |

| Surfaces Observed With Pencil Hardness Increasing |||||||
|---|---|---|---|---|---|---|
| Example 2 | Surface Image |  |  |  |  |
|  | Pencil Hardness | 2B | B | HB | H |
| Comparative Example 2 | Surface Image |  |  |  |  |
|  | Pencil Hardness | 2B | B | HB | H |

LYOTROPIC CHROMONIC LIQUID CRYSTAL COMPOSITION, METHOD FOR MANUFACTURE OF LYOTROPIC CHROMONIC LIQUID CRYSTAL COATING FILM, AND LYOTROPIC CHROMONIC LIQUID CRYSTAL COATING FILM MANUFACTURED THEREBY

CROSS-REFERENCE TO RELATED APPLICATION

This application claims priority to and the benefit of Korean Patent Application Nos. 10-2008-0109205, 10-2008-0109207, and 10-2008-0109208, filed on Nov. 5, 2008, the entire content of which is incorporated herein by reference.

BACKGROUND OF THE INVENTION

1. Field of the Invention

Aspects of the present invention relate to a lyotropic chromonic liquid crystal composition, a method for the manufacture of a lyotropic chromonic liquid crystal coating film and a lyotropic chromonic liquid crystal coating film manufactured thereby. More particularly, aspects of the present invention relate to a lyotropic chromonic liquid crystal composition having high hardness and improved aggregation stability between liquid crystals, a method for the manufacture of a lyotropic chromonic liquid crystal coating film having high hardness and improved aggregation stability between liquid crystals by using a chromonic liquid crystal composition, and a lyotropic chromonic liquid crystal coating film manufactured thereby, in manufacturing optical films such as a polarizing plate, a color filter, a retardation film, and the like, employed to a picture display device such as a liquid crystal display (LCD) or an organic light-emitting display (OLED), or films employed to microelectronics, optics, communications, computer technology, biosensors, and the like, using a chromonic liquid crystal composition.

2. Description of the Related Art

In a liquid crystal display (LCD) device, for example, optical films having a polarizing film and a retardation film combined therein have been used in causing various polarizing characteristics.

Among these films, the polarizing film that is stretched using polyvinyl alcohol (PVA) with an iodine dye as a polarizer has been generally used. The optical activities of these films are determined by dichroism of the PVA-dye material used. However, since iodine has large sublimation properties, it is disadvantageously poor in durability, such as heat resistance or light resistance, when added as the polarizing element to a polarizing film.

To address this drawback, an azo dye (for example, direct blue or direct red) has been used in place of iodine. The azo dye exhibits weaker dichroism than the iodine dye, while ensuring durability, so that high optical properties may not be properly demonstrated.

Likewise, in an optical compensation film, such as the retardation film, there have been proposed use examples of a laminated film constituted by laminating stretched films as optical compensation films or retardation films, consisting of a combination of stretched films of a denatured cellulose-based film or a denatured polycarbonate-based film, giving a λ/4 retardation film and a λ/2 retardation film, in Japanese Patent No. 3174367, etc. However, in the proposed film, optical axes of the retardation films consisting of stretched films may vary according to the direction in which the films are stretched.

That is to say, the respective films are laminated such that an absorption axis and a retardation axis are at a desired angle by cutting the respective films along directions of optical axes thereof. In more detail, the absorption axis of a polarizing plate is generally parallel with the direction in which the polarizing plate is stretched, and the retardation axis of the retardation film is also parallel with the direction in which the retardation film is stretched. Accordingly, in order to laminate the polarizing plate and the retardation film at an angle of, for example, 45° formed between the absorption axis and the retardation axis, one of the films should be cut in the direction of 45° with respect to the stretched direction of the film. In a case where the film is cut to then be attached, the angle between the absorption axis and the retardation axis is varied for all of the cut films, resulting in a quality change of all products, incurring increased costs and time in the manufacture of the products. Therefore, an optical film coated with a liquid crystal compound having a planar molecular structure as an aqueous organic dye has recently been proposed.

As representative examples, U.S. Pat. Nos. 2,400,877 and 2,544,659 provide methods of producing a light polarizing element by coating a solution of a dichromatic material on the surface of a substrate, simultaneously with evaporating the solvent from the surface of the substrate, orienting the molecule of the dichromatic material as a nematic phase, and moderately solidifying the molecule in the oriented state. The dichromatic nematic material is water or alcohol-soluble organic dye, which is transformed on the surface of a substrate into a nematic phase.

A liquid crystal is a state of matter in which molecules exhibit long-range orientational order and wherein long-range positional order is either reduced (one-dimensional positional order in smectic phases) or absent (nematic phases).

This intermediate ordering places liquid crystals between crystalline solids (which possess both positional and orientational order) and isotropic fluids (which exhibit no long-range order). Solid crystal or isotropic fluid can be transformed into a liquid crystal by changing temperature or by using an appropriate diluting solvent to change the concentration of mesomorphic molecules. Generally, the liquid crystal formed by changing temperature, like in the former case, is called a thermotropic liquid crystal, and the liquid crystal formed by changing the concentration the diluting solvent, like in the latter case, is called a lyotropic liquid crystal.

Alignment of thermotropic liquid crystals is based on a special unidirectional treatment of the plates or substrates that bound the liquid crystalline material. Such techniques are disclosed in U.S. Pat. No. 5,596,434. The '434 patent discloses that the plates are covered with a polymer (such as polyimide) layer which is mechanically rubbed. The direction of rubbing sets the direction of orientation of the thermotropic liquid crystal, i.e., the director, at the substrate, as a result of anisotropic molecular interactions at the interface. The phenomenon of orienting action between the anisotropic (rubbed, for example) substrate and the liquid crystalline alignment is called "anchoring." Alignment by surface anchoring is a standard means of alignment in thermotropic liquid crystalline displays. Surfaces are typically treated with a polymer or a surfactant in order to obtain the desired alignment effects.

Lyotropic liquid crystals are more difficult to align than their thermotropic counterparts. The reason is that most lyotropic liquid crystals are based on amphiphilic materials (surfactants) dissolved in water or oil. Amphiphilic molecules have a polar (hydrophilic) head and a non-polar (hydrophobic) aliphatic tail. When surfactant molecules are in contact with a substrate, their amphiphilic nature generally results in a perpendicular orientation of the molecule with respect to the plane of the substrate. Perpendicular alignment means that the preferred orientation is the so-called homeotropic alignment, in which the optical axis is perpendicular to bounding plates. Here, the concentration and structure of a given molecule plays a great role in the formation of the orientational order of liquid crystals. A general lyotropic liquid crystal has a long column formed by laminating rod-like molecules or discotic or plank-shaped molecules.

Among various classes of lyotropic liquid crystals, lyotropic chromonic liquid crystals (LCLC) are drawing much attention as useful substance. The molecular structures of LCLCs are markedly different from those of conventional lyotropic liquid crystals based on an amphiphilic material with an ionic function group at an end of a flexible, rod-like aliphatic chain molecule in that LCLC molecules have a hydrophilic or ionic group at a rigid, plank-like aromatic molecule. The LCLC family embraces a range of dyes, drugs, nucleic acids, antibiotics, carcinogens, and anti-cancer agents. The molecular and macrostructure of the LCLC are shown in FIGS. 1 and 2. The LCLC is constructed such that heads of hydrophilic groups 1 directed outward and tails of aggregated or micellar shaped hydrophobic groups 2, dissolved in an aqueous solution, as shown in FIG. 1, or the LCLC molecules having hydrophilic groups 3 attached at the periphery of a plank-like aromatic hydrophobic core 4 are laminated, as shown in FIG. 2. This is called self-assembly. The dual character of the self-assembly gives stable alignment characteristics. Accordingly, the LCLC molecules have gained attention as materials used for various optical devices.

The π-π interaction of the aromatic cores is the main mechanism of molecular face-to-face stacking [J. Lydon, Chromonics, in: Handbook of Liquid Crystals (Wiley-VCH, Weinheim, 1998) v. 2B, p. 981 and Current Opin. Col. Inter. Sci. 3, 458 (1998)]. Hydrophilic ionic groups at the periphery of the molecules make the material water-soluble. These materials have become a subject of intensive studies lately as it became clear that they can be used as internal polarizing elements in liquid crystal displays, see T. Sergan et al., Liquid Crystals v. 5, pp. 567-572 (2000)

U.S. Pat. No. 5,948,487 or PCT/US2000/031181, for example, discloses a structure aligned using nematic liquid crystal materials that contain at least one triazine group. U.S. Pat. No. 6,570,632 discloses a method of acquiring an optical film by coating a chromonic material containing Cromolyn ($C_{23}H_{14}O_{11}Na_2$) on a glass substrate, rubbing and aligning, followed by drying to remove a solvent. The alignment structure of the thus formed optical film is shown in FIG. 3.

In the aligned optical film, as seen in FIG. 3, a molecular plane of LCLC molecule 13 is placed on a Y-Z plane of a base film 11, and the long axis of the LCLC molecule 13 is aligned in the Y-axis direction. However, in the alignment structure, the molecular planes of several molecules may not be perfectly aligned on the Y-Z plane or the long axis of the LCLC molecule 13 may be misaligned away from the Y-axis direction.

To solve these problems, aligning methods of a combination of electrostatic layer stacking and shear orientation are disclosed in several literatures: T. Schneider and O. D. Lavrentovich: Langmuir, 2000, 16, 5227; T. Schneider, K. Artyushkova et. al.: Langmuir, 2005, 21, 2300; and U.S. patent publication U.S. 2002/0168511.

The alignment structure of the thus formed optical film is shown in FIG. 4. Poly cations 12 are coated on a base film 11 made of glass or mica, an aqueous violet 20 solution 13, a kind of an anionic LCLC 13, is coated and aligned by a mechanical shear force induced in the X-axis direction, and unnecessary surplus materials are removed by cleaning and then dried, leaving an electrostatically laminated chromonic liquid crystal structure on the dried film. As shown in FIG. 5, a laminated structure in which the poly cations 12 and the anionic LCLC 13 are repeatedly laminated can be obtained by repeating the aforementioned process.

However, even in the above-described methods, optical films, which are formed by coating an LCLC composition dissolved in an aqueous solution or an organic solvent containing solution, and drying the resulting product, during the self-assembly process of liquid crystal molecules, the liquid crystal molecules are liable to segregation in horizontal and vertical planes. In addition, cracks are likely to occur to liquid crystal compositions remaining due to a volumetric reduction caused when a large amount of solvent is removed in the course of drying the liquid crystal molecules. Further, since the optical films have low hardness and a weak binding force with respect to a base film, they are prone to delamination. Additionally, since cohesiveness between molecular aggregates of a liquid crystal dye is weak, there are several problems including poor stability of a thin film, complicated processing conditions due to humidity in the surrounding of an aqueous solution, and so on. In addition, the fabricated optical film is likely to lose its aligned state to then form an optical isotropic phase when it contacts water.

Therefore, it is necessary to increase the intensity of an interaction between the base film and the liquid crystal dye in consideration of a weak binding strength between the molecular aggregates of the liquid crystal dye and a weak binding strength between the aggregates and the base film.

DISCLOSURE OF THE INVENTION

Aspects of the present invention provide a lyotropic chromonic liquid crystal composition which can obtain an optical film having high surface hardness and producing no cracks even after drying by coating a chromonic liquid crystal composition with a monomer, instead of an aqueous solution, aligning, and curing without performing drying, to increase a binding strength between molecular aggregates of a liquid crystal dye and between the aggregates and a base film, a method for the manufacture of a lyotropic chromonic liquid crystal coating film, and a lyotropic chromonic liquid crystal coating film manufactured thereby.

1. Lyotropic Chromonic Liquid Crystal Composition

The lyotropic chromonic liquid crystal composition according to the present invention includes chromonic liquid crystal compounds and monomers having opposite acid-base characteristics. That is to say, the lyotropic chromonic liquid crystal composition includes a basic chromonic liquid crystal compound having a basic group and an acidic monomer having an acidic group; or an acidic chromonic liquid crystal compound having an acidic group and basic monomer having a basic group.

That is to say, the lyotropic chromonic liquid crystal composition according to the present invention generates lyotropic chromonic liquid crystals having novel groups through interaction between cations (or anions) of basic groups (or acidic groups) surrounding an aromatic hydrophobic core of the chromonic liquid crystal compound, and anions (or cations) of the acidic monomer (or the basic monomer) as their counter ions. In addition, the lyotropic chromonic liquid crystal composition according to the present invention increases a binding strength between stacked molecular aggregates of a liquid crystal dye and between the molecular aggregates and the base film through a polymerization reaction using the novel functional groups in curing the composition. Accordingly, excellent mechanical, optical and electrical characteristics of the formed film can be achieved.

Hereinafter, the present invention will be described with regard to technical structures.

(1) Basic and Acidic Chromonic Liquid Crystal Compounds

As described above, the chromonic liquid crystal compound includes hydrophilic groups surrounding a hydrophobic core formed of rigid, plank-shaped aromatic molecules. In the specification of the present invention, a hydrophobic core having basic or acidic hydrophilic functional groups bonded thereto is used as the "basic chromonic liquid crystal compound" or "acidic chromonic liquid crystal compound." When the basic hydrophilic functional group (to be referred to as 'basic group' hereinafter) and the acidic hydrophilic functional group (to be referred to as 'acidic group' hereinafter) are mixed with and react with an acidic monomer and a basic monomer, respectively. Since the basic group renders a cation and the acidic group renders an anion, so that it is subjected to ionic bonding with the anion of the acidic monomer or the cation of the basic monomer. The bonded monomer is polymerized with additional monomers existing in the composition, thereby establishing a strong bond between the stacked molecular aggregates as lyotropic liquid crystals.

Among the compounds disclosed in the above listed literatures [J. Lydon, Chromonics: Handbook of Liquid Crystals (Wiley-VCH, Weinheim, 1998) v.2B, p.981 and Current Opin. Col. Inter. Sci. 3, 458(1998)], and [T. Sergan, et. al: Liquid Crystals v.5, pp. 567-572(2000)], the chromonic liquid crystal compound is constructed such that a hydrophobic core is surrounded by base (or acid) groups.

The term 'basic group' used herein refers to a functional group in direct contact with an aromatic ring. Any functional group can be used as the basic group without particular limitation as long as it has basicity, and specific examples of the basic group may include functional groups rendering nitrogen ion ($N^+$) when reacting with an acidic monomer, for example, amine, imine, amide, azide, nitrate or ammonium group.

As described above, the basic group generally exists in the form of an amine group or an imine group. Alternatively, the basic group may exist in the form of a salt with the nitrogen ion ($N^+$) bonded with another anion. When the basic group reacts with an acidic monomer to be described later, the nitrogen ion ($N^+$) is exposed to then be bonded with an anion of an acidic group of the acidic monomer.

Specific examples of the basic chromonic liquid crystal compound are the followings represented by the formulae (I-1) to (I-11), but are not limited to the following compounds:

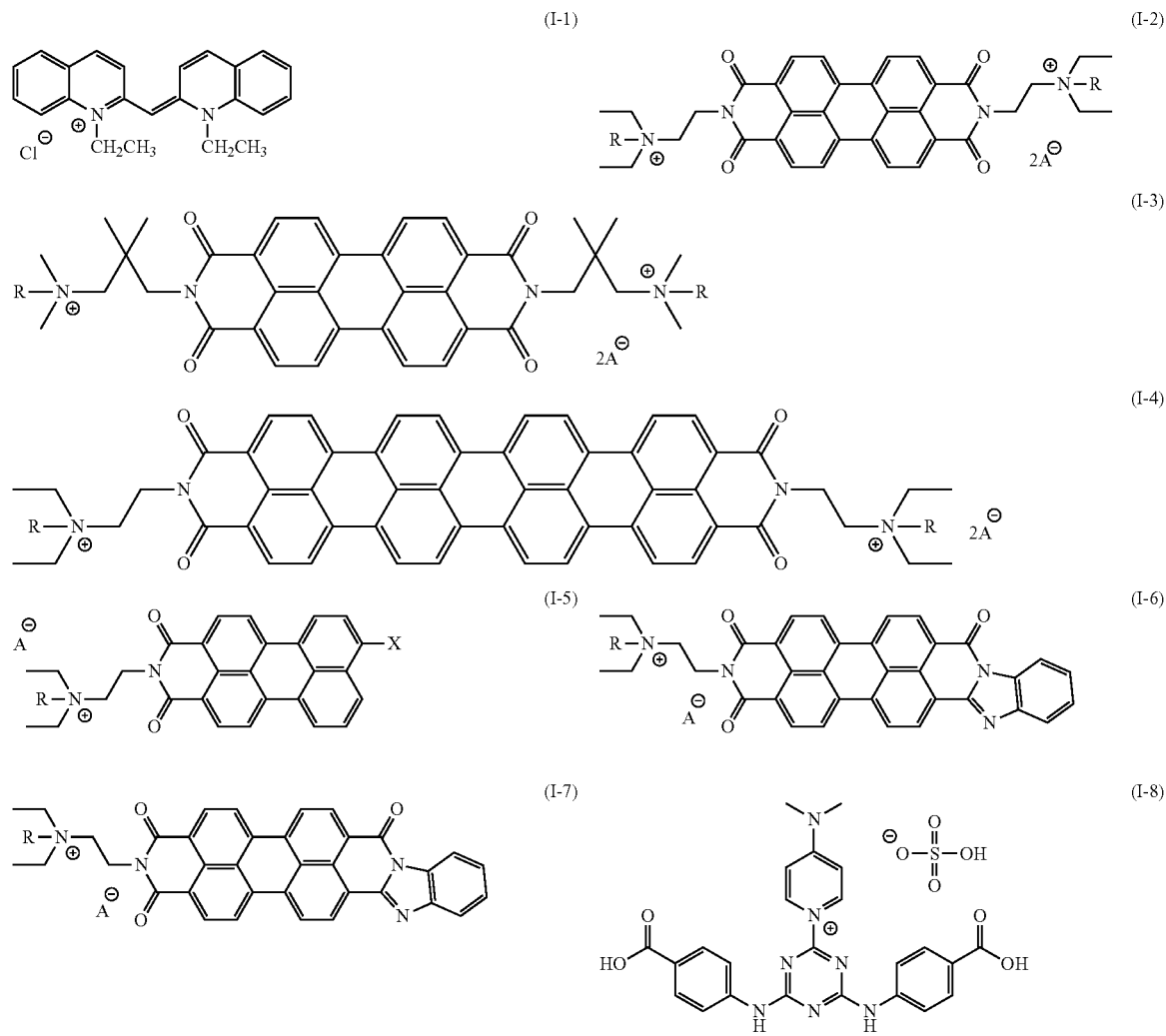

(I-9)

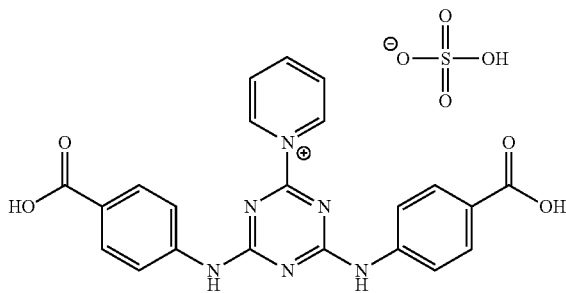

(I-10)

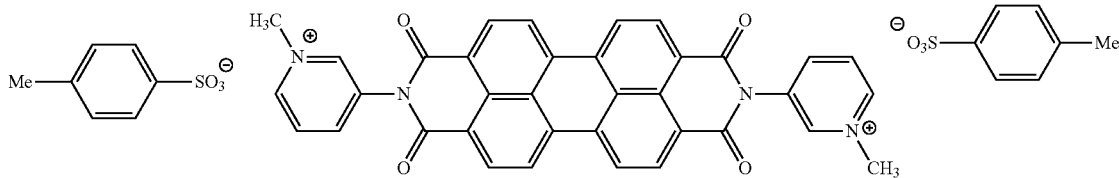

(I-11)

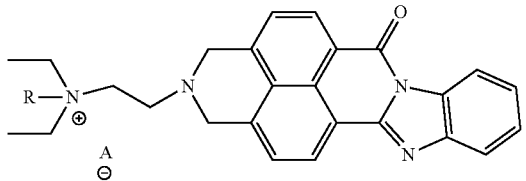

wherein R is alkyl or hydrogen atom, A is one selected from the group consisting of Cl,

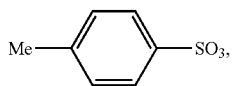

where Me is an alkyl group containing methyl, and HCOO, and X is hydrogen or halogen atom, such as Cl, or Br.

In addition, 'acidic group' as used herein refers to a functional group in direct contact with an aromatic ring. Non-limiting examples of the acidic group may include a carboxylate ($COO^-$) salt, ester, and carboxy, rendering carboxylate ($COO^-$) ion when reacting with a basic monomer; a phosphate salt, phosphine, phosphoric acid, and phosphonic acid, rendering phosphate ion ($PO_3^-$) when reacting with a basic monomer; and a sulfonate salt, and sulfonic acid, rendering sulfonate ion ($SO_3^-$) when reacting with a basic monomer.

As described above, the acidic group generally exists in the form of ester, phosphine or sulfonic acid. Alternatively, the acidic group may exist in the form of a salt with the carboxylate ($COO^-$) salt bonded with another cation, such as $H^+$, $NH_4$, $Li^+$, $Na^+$, $K^+$, or $Cs^+$. When the acidic group reacts with a basic monomer to be described later, the anion is exposed to then be bonded with a cation of an acidic group of the acidic monomer.

Specific examples of the acidic chromonic liquid crystal compound are the followings represented by the formulae (II-1) to (II-23), but are not limited to the following compounds:

(II-1)

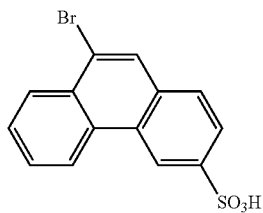

(II-2)

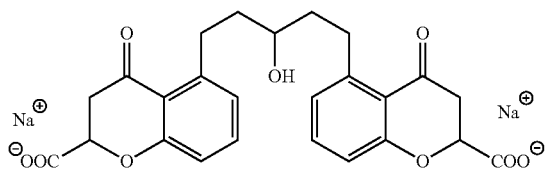

-continued
(II-3)
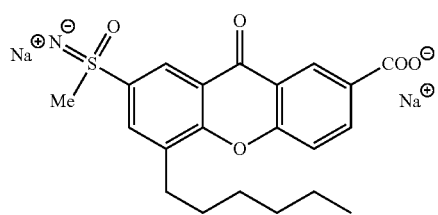
(II-4)
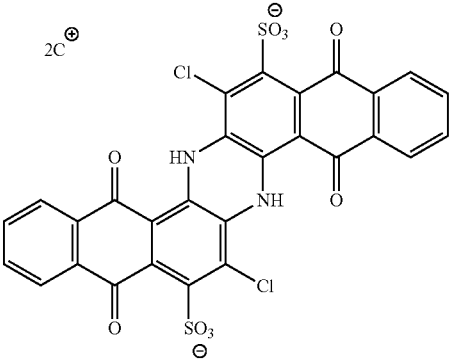
(II-5)
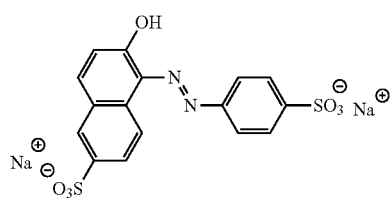
(II-6)
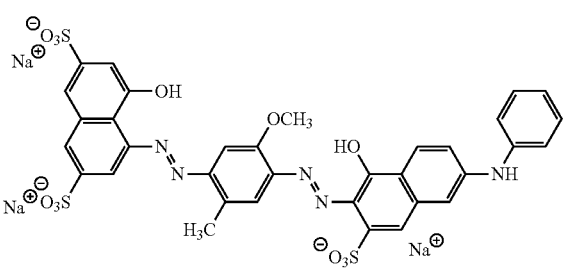
(II-7)
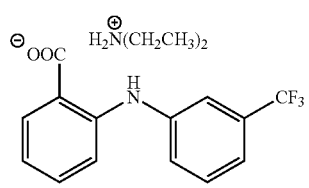
(II-8)
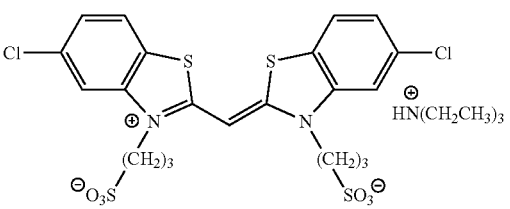
(II-9)
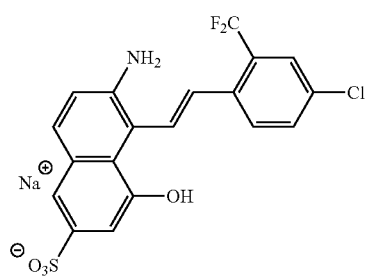
(II-10)
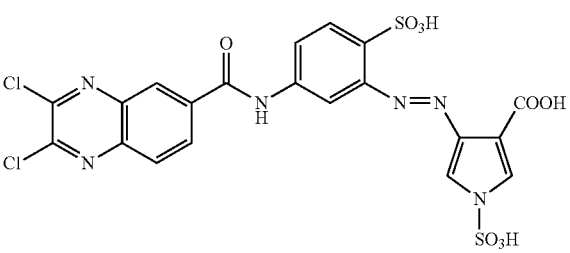
(II-11)
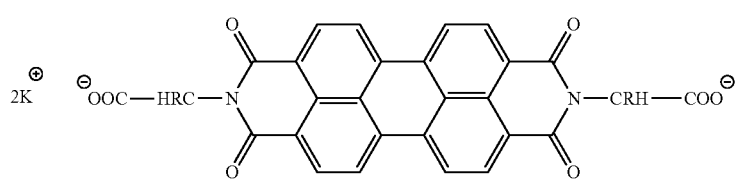
(II-12)
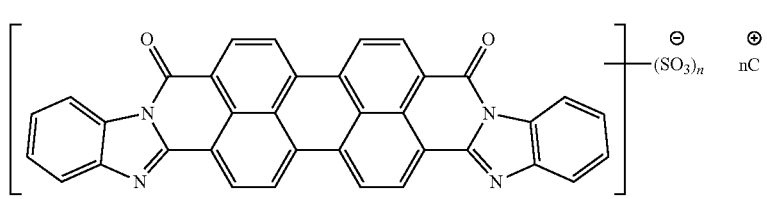

-continued
(II-13)
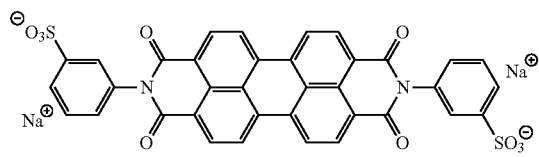
(II-14)
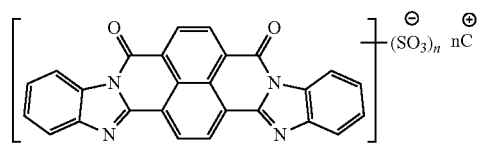
(II-15)
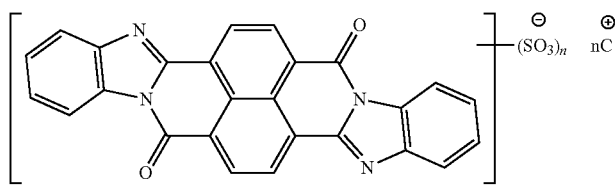
(II-16)
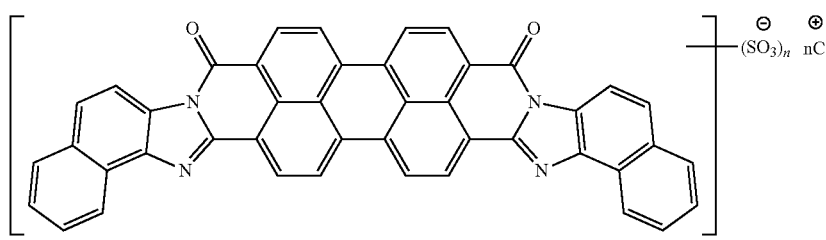
(II-17)
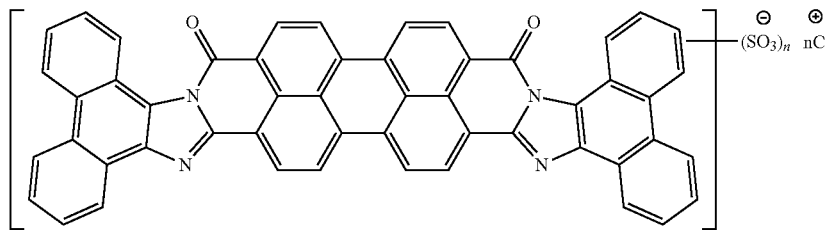
(II-18)
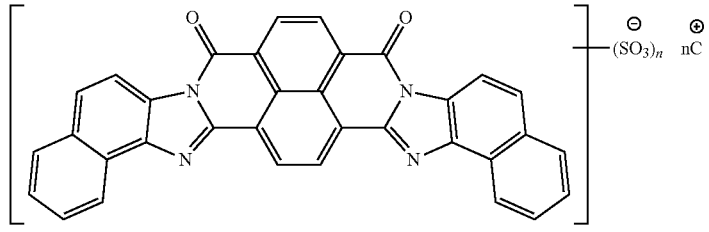
(II-19)
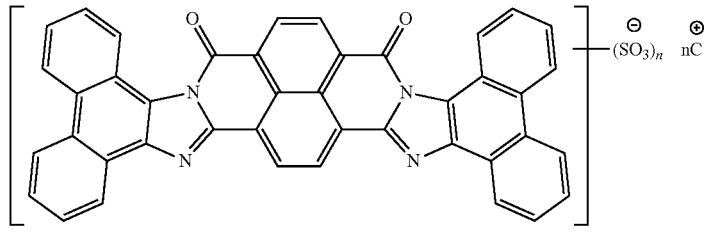
(II-20)
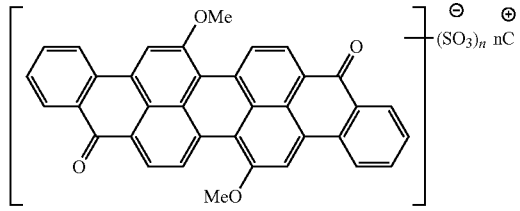
(II-21)
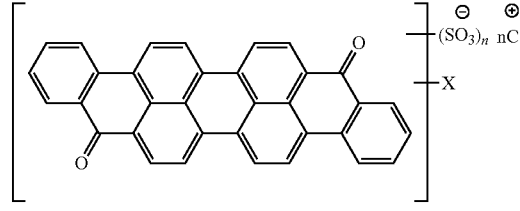

-continued

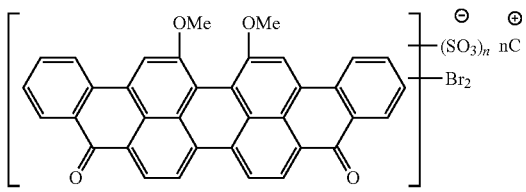 (II-22)

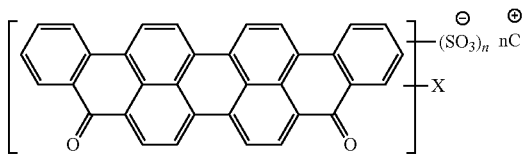 (II-23)

wherein R is alkyl or hydrogen atom, n=1~3, X is 1 to 3 hydrogen or halogen atoms, Me is an alkyl group containing methyl. In the formula II-12 to formula II-23, C is a cation, such as $H^+$, $NH_4^+$, $Li^+$, $Na^+$, or $K^+$.

The basic or acidic chromonic liquid crystal compound is in a concentration range of 3 to 40 wt. %, preferably 5 to 30 wt. %, based on a total weight of the composition. The stated concentration range of the basic or acidic chromonic liquid crystal compound is preferred so that the liquid crystal composition has a liquid crystal property between a solid crystal phase and an isotropic fluid phase.

(2) Acidic and Basic Monomers

As described above, in the conventional optical film obtained by mixing a chromonic liquid crystal compound and an aqueous solution, aligning the mixed solution and drying the aligned solution, cracks are likely to be generated in the drying of the solution and cohesiveness between liquid crystal molecules may become weak.

Accordingly, in the present invention, an acidic or basic monomer is used, instead of the aqueous solution to generate a strong ionic bond with a basic group of the basic chromonic liquid crystal compound in the case of the acidic monomer, and with an acidic group of the acidic chromonic liquid crystal compound in the case of the basic monomer, and polymerization is performed in a state in which the bonded liquid crystal molecules are stacked and aligned to induce strong molecular bonds, thereby achieving high cohesiveness between the liquid crystal molecules and high surface hardness.

In the present invention, when the composition includes a combination including the acidic chromonic liquid crystal compound and a basic monomer, water is preferably added to disperse the liquid crystal compound and the monomer due to the effect of a sulfone group in the acidic chromonic liquid crystal compound, and water may then be removed.

The term "acidic monomer" used herein refers to, but not limited to, a monomer having an acidic group corresponding to a basic group of the basic chromonic liquid crystal compound, and may include acrylate based monomers rendering a carboxylate ($COO^-$) ion when reacting with the basic chromonic liquid crystal compound, including carboxylate ($COO^-$) salt, ester, and carboxy; monomers rendering a phosphoric acid ($PO_3^-$) ion when reacting with the basic chromonic liquid crystal compound, including phosphate, phosphine, phosphoric acid, and phosphonic acid; and monomers rendering a sulfonic acid ($SO_3^-$) ion, including sulfonate and sulfonic acid. Representative examples of the acidic monomer may include metal salts of (meth)acrylic acid, crotonic acid, maleic acid or itaconic acid, 2-acrylamido-2-methyl propane sulfonate, sulfopropyl acrylate or methacrylate, other soluble forms thereof, other polymerizable carboxylic acids or sulfonic acids, sulfomethylated acrylamide, aryl sulfonate, and sodium vinyl sulfonate, singly or in combination of one or two of these materials. Additional examples of the acidic monomer are the followings represented by the formulae (III-1) to (III-19):

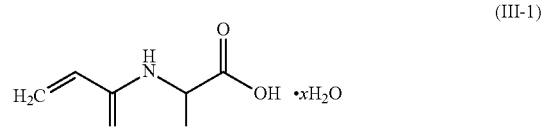 (III-1)

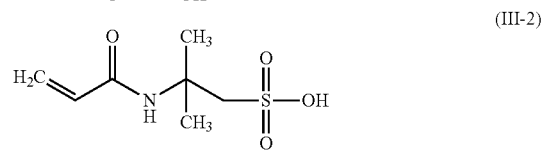 (III-2)

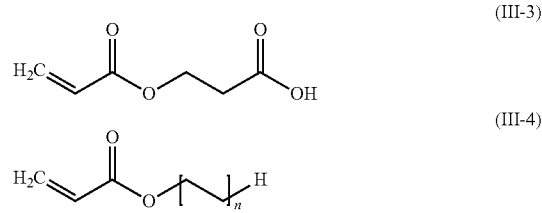 (III-3)

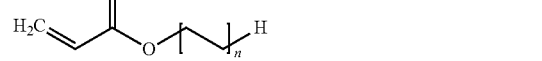 (III-4)

wherein n=0~3;

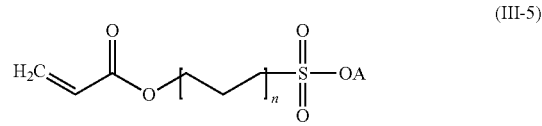 (III-5)

wherein A is hydrogen, alkali metal cation or primary to quaternary ammonium cation, and n=0~3;

 (III-6)

 (III-7)

 (III-8)

-continued

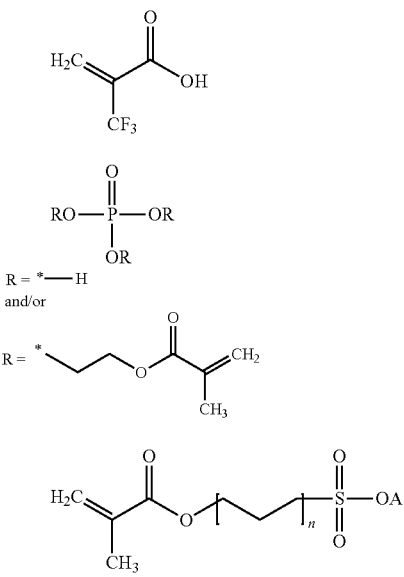

wherein A is hydrogen, alkali metal cation or primary to quaternary ammonium cation, and n=0~3;

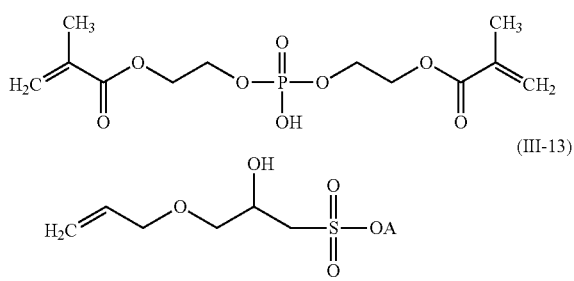

wherein A is hydrogen, alkali metal cation or primary to quaternary ammonium cation;

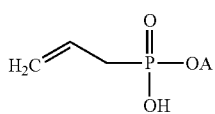

wherein A is hydrogen, alkali metal cation or primary to quaternary ammonium cation;

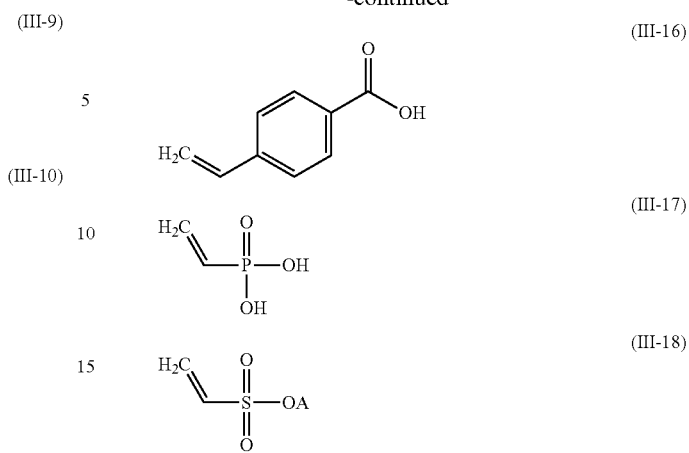

wherein A is hydrogen, alkali metal cation or primary to quaternary ammonium cation; and

In addition, the term "basic monomer" used herein refers to, but not limited to, a monomer having a basic group corresponding to an acidic group of the acidic chromonic liquid crystal compound, and the basic group refers to a functional group rendering a cation, generally nitrogen ion (N⁺) of amine, imine, amide, azide, nitrate or ammonium group, when reacting with the acidic chromonic liquid crystal compound. Representative examples of the basic monomer may include, but not limited to, dialkylaminoalkylacrylate and methacrylate, and quaternary or acid salts thereof (for example, DMAEA or MAQ), dialkylaminoalkylacrylamide and methacrylamide, and quaternary or acid salts thereof, N,N-diarylamine and ammonium salt thereof, diaryldimethyl ammonium chloride (DADMAC), and Mannich products. The alkyl group is generally C1-4 alkyl. Additional examples of the basic monomer are the followings represented by the formulae (IV-1) to (IV-18):

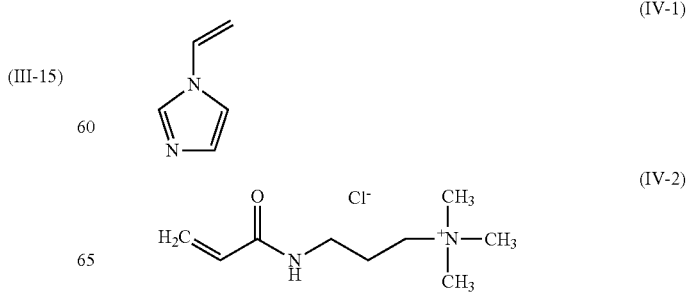

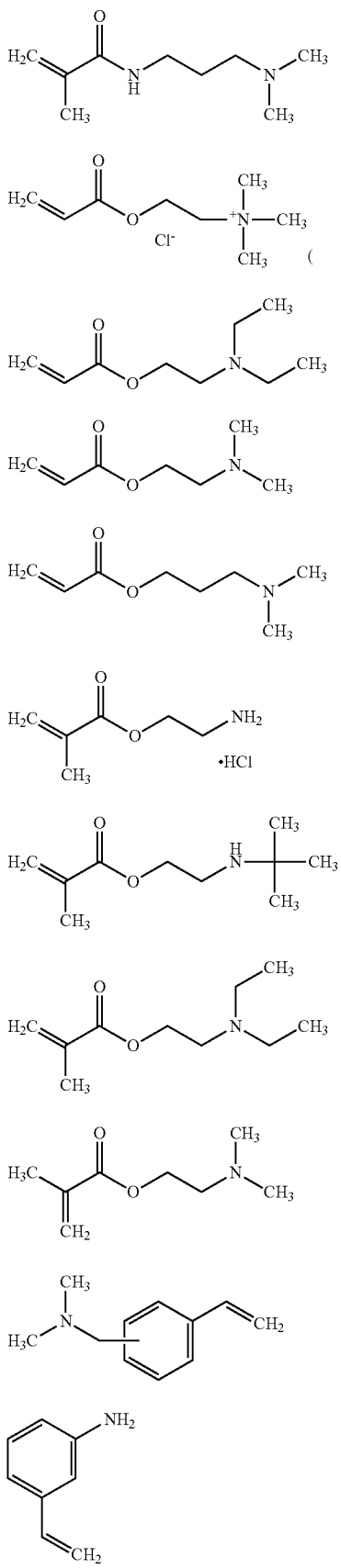
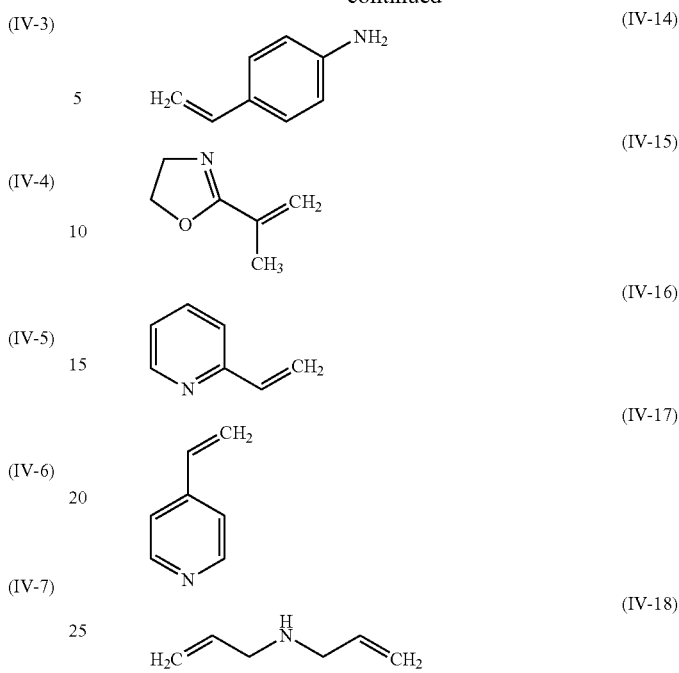

(3) Polymerization Initiator

The lyotropic chromonic liquid crystal composition according to the present invention may further include in addition to the chromonic liquid crystal compound and the monomer, a polymerization initiator for facilitating polymerization after alignment, including at least one of a photoinitiator and a thermal initiator.

In the present invention, the photoinitiator is used when the composition is photopolymerized by ultraviolet (UV) light. Specific examples of the photoinitiator may include acetphonones such as diethoxyacetphonone, 2-hydroxy-2-methyl-1-phenylpropan-1-on, benzyldimethylketal, 1-hydroxycyclohexyl-phenylketone, or 2-methyl-2-morphine(4-thiomethylphenyl) propan-1-on; benzoinethers such as benzoinmethylether, benzoinethylether, benzoinisopropylether, benzoinisobutylether; benzophenones such as benzophenone, o-benzoylbenzoic acid methyl, 4-phenylbenzophenone, 4-benzoyl-4'-methyldiphenylsulfurous acid, 4-benzoyl-N, N-dimethyl-N-[2-(1-oxo-2-prophenyloxy) ethyl] benzenemethanaminium bromide, or (4-benzoylbenzyl) trimethylammonium chloride; thioxantones such as 2, 4-diethylthioxantone, or 1-chloro-4-dichlororthioxantone; 2, 4, 6-trimethylbenzoyldiphenylbenzoyl oxide; and so on, which may be used singly or in combination. In addition, an amine based compound such as N, N-dimethylparatoluizine, or 4, 4'-diethylaminobenzophenone may be used as an enhancer singly or in combination.

In addition, when the lyotropic chromonic liquid crystal composition according to the present invention is thermally polymerized, a thermal initiator is used. Organic peroxide free radical initiators including diacylperoxides, peroxyketals, ketone peroxides, hydroperoxides, dialkylperoxides, peroxyesters and peroxycarbonates may be used as the thermal initiator. Specific examples of the thermal initiator may include lauroyl peroxide, benzoyl peroxide, cyclohexanone peroxide, 1,1-bis(t-butylperoxy)3,3,5-trimethylcyclohexane, and t-butylhydroperoxide. Alternatively, a combination of persulfate/bisulfate may also be used as the thermal initiator.

A content of the polymerization initiator is preferably in a range of 0.01 wt. % to 10 wt. %, more preferably in a range of 0.5 wt. % to 5 wt. %, based on a total weight of the lyotropic chromonic liquid crystal composition. If the content of the polymerization initiator is smaller than 0.1 wt. %, it is difficult to achieve polymerization effects. If the content of the polymerization initiator is greater than 10 wt. %, an excessive amount of the polymerization initiator is used, relative to achievable polymerization initiating effects, which is not cost-effective.

(4) Additives and Solvents

The lyotropic chromonic liquid crystal composition used in the present invention may further include additives in some cases. In order to facilitate viscosity adjustment, the lyotropic chromonic liquid crystal composition of the present invention may further include a solvent such as an organic solvent or water. Examples of the additives may include a non-ionic vinyl monomer added to be copolymerizable with the monomer in order to adjust physical properties of a formed thin film, a leveling agent for increasing smoothness of the composition, a wetting agent for enhancing wettability of the composition with respect to a base film by reducing surface tension of the composition, a UV stabilizer, a thermal stabilizer, a conductive surfactant, a crosslinking monomer, an anti-aging agent, a denaturant, and others. Quaternary ammonium is preferably used as the conductive surfactant.

The non-ionic vinyl monomer is a copolymerizable non-ionic ethylene-based unsaturated monomer that is well known in the art. Preferred examples of the non-ionic vinyl monomer are compounds represented by the formulae (V) or (VI):

$$CH_2=C(X)Z \qquad (V)$$

$$CH_2=CH-OC(O)R \qquad (VI)$$

wherein X is H or methyl; Z is $-C(O)OR^1$, $-C(O)NH_2$, $-C(O)NHR^1$, $-C(O)N(R^1)_2$, $-C_6H_4R^1$, $-C_6H_4OR^1$, $-C_6H_4Cl$, $-CN$, $-NHC(O)CH_3$, $-NHC(O)H$, $N-(2-pyrrolidonyl)$, N-caprolactamil, $-C(O)NHC(CH_3)_3$, $-C(O)NHCH_2CH_2$, $-N$-ethylene urea, $-SiR_3$, $-C(O)O(CH_2)xSiR_3$, $-C(O)NH(CH_2)xSiR_3$, or $-(CH_2)xSiR_3$; x is an integer of 1 to 6; R is independently $C_1-C_{18}$ alkyl; and $R^1$ is independently $C_1-C_{30}$ alkyl, hydroxy substituted $C_2-C_{30}$ alkyl or halogen substituted $C_1-C_{30}$ alkyl.

Suitable examples of water-insoluble non-ionic vinyl monomer may include $C_1-C_{30}$ alkyl (meth)acrylate; $C_1-C_{30}$ alkyl (meth)acrylamide; styrene; substituted styrenes exemplified by vinyl toluene (i.e., 2-methylstyrene), butyl styrene, isopropyl styrene, or p-chlorostyrene; vinyl esters exemplified by vinyl acetate, vinyl butyrate, vinyl caprolate, vinyl pivalate, or vinyl neodecanoate; unsaturated nitriles exemplified by methacrylonitrile, or acrylonitrile; and unsaturated silanes exemplified by trimethylvinyl silane, dimethylethylvinyl silane, allyldimethylphenylsilane, allyltrimethylsilane, 3-acrylamidopropyltrimethylsilane, 3-trimethylsilylpropyl methacrylate, but not limited thereto.

Suitable examples of water-soluble non-ionic vinyl monomer may include, but not limited to, $C_2-C_6$ hydroxyalkyl (meth)acrylate; glycerol mono(meth)acrylate; tris(hydroxymethyl)ethane mono(meth)acrylate; pentaerythritol mono(meth)acrylate; N-hydroxymethyl (meth)acrylamide; 2-hydroxyethyl (meth)acrylamide; 3-hydroxypropyl (meth) acrylamide; (meth)acrylamide; N-vinyl caprolactam; N-vinyl pyrrolidone; methacrylamidoethyl-N-ethylene urea (i.e., $CH_2=C(CH_3)C(O)NH\,CH_2CH_2-N$-ethylene urea), C1-C4 alkoxy substituted (meth)acrylate and (meth)acrylamide, exemplified by methoxyethyl (meth)acrylate, 2-(2-ethoxyethoxy)ethyl (meth)acrylate; and combinations of these materials.

In particular, preferred examples of the non-ionic vinyl monomer may include $C_1-C_{18}$ alkyl ester of acrylic acid and methacrylic acid, methacrylamidoethyl-N-ethylene urea, and combinations thereof.

Specific examples of the crosslinking monomer may include diamine-based monomer, acryl-based multi-functional monomer, epoxy-based crosslinking agent, metal chelate crosslinking agent, silane-based crosslinking agent, aldehyde, N-methylol compound, dioxane derivative, a compound functioning by activating a carboxyl group, activated vinyl compound, activated halogen compound, isoxazole and dialdehyde starch. These compounds may be used singly or in combination of two or more of the compounds. An anionic vinyl monomer is preferably used in a case of using a non-ionic vinyl monomer having two or more vinyl groups such as polyethylene glycoldi(meth)acrylate, polypropylene glycoldi(meth)acrylate, phenoxyethyldi(meth)acrylate, trimethylol ethane tri acrylate, trimethylol propane triacrylate, neopentylglycoltri(meth)acrylate, pentaerythritol tetraacrylate, pentaerythritol triacrylate, dipentaerythritol pentaacrylate, dipentaerythritol hexaacrylate, bisphenol A diethoxy diacrylate, hexanediol diacrylate, tripropyleneglycol diacrylate, triethyleneglycol diacrylate, dipropyleneglycoldiacrylate, diethyleneglycoldiacrylate, divinylbenzene, diallylether, or di(meth)acryl amide, or a basic chromonic liquid crystal compound. A cationic vinyl monomer is preferably used in a case of using an acidic chromonic liquid crystal compound. The listed vinyl monomers may be used singly or in combination.

Examples of the anti-aging agent may include a phenol-based compound, an amine-based compound, an organic sulfur based compound, and a phosphine based compound. Examples of the denaturant may include glycols, silicons, and alcohols. The surfactant may be used to smooth a surface of an optical film and specific examples thereof may include a silicon-based surfactant, an acryl-based surfactant, a fluorine-based surfactant, and so on.

Additionally, the lyotropic chromonic liquid crystal composition according to the present invention may further include a dispersant, a terminator, a curing agent, an antiozonant, an antioxidant, a plasticizer, a viscosity modifier such as a thickener or a filler, a coagulant for enhancing contact affinity between particles after being deposited on a substrate, and particular compounds functioning as dyes or pigments absorbing UV, IR or visible rays. For example, an additive for improving optical transparency may include dimethylaminopyridine (DMAP). In addition, the liquid crystal composition may include various additives used in the manufacture of common photoresist, crosslinking monomers, and so on.

Water may be used as a solvent. Alternatively, an organic solvent such as alcohols, acetates, ethers, glycols, ketones, or carbonates, or a non-protogenic, polar organic solvent such as dimethylformaldehyde (DMF), dimethylsulfoxide (DMSO), N-methylpyrrolidone (NMP), or N,N-dimethylacetamide (DMAc), may be used as a solvent singly or in combination of two or more of these materials. Preferably, dimethylformaldehyde (DMF) or methanol is used singly or in combination.

Amounts of the additive and the solvent added are preferably in a range of 0.01 wt. % to 40 wt. %, more preferably in a range of 0.1 wt. % to 35 wt. %, based on a total weight of the basic chromonic liquid crystal composition. Amounts of the additive and the solvent added are preferably in a range of 0.1 wt. % to 80 wt. %, more preferably in a range of 40 wt. % to 80 wt. %, based on a total weight of the acidic chromonic liquid crystal composition. A combination of the chromonic compound and the monomer may demonstrate most preferred characteristics by adding the additive and solvent within the amount range listed above.

2. Method of Manufacturing Lyotropic Chromonic Liquid Crystal Coating Film

Next, a method for manufacturing a lyotropic chromonic liquid crystal coating film according to an embodiment of the present invention using the lyotropic chromonic liquid crystal composition according to the present invention will be described.

The manufacturing method of the lyotropic chromonic liquid crystal coating film according to the present invention includes coating the lyotropic chromonic liquid crystal composition on a base film, the lyotropic chromonic liquid crystal composition comprising chromonic liquid crystal compounds and monomers each having acid-base properties opposite to each other, and further comprising a polymerization initiator including at least one of a photoinitiator and a thermal initiator; aligning a coating film containing the lyotropic chromonic liquid crystal composition; and curing the coating film through thermal polymerization or photo polymerization.

Manufacturing a thin liquid crystal film having an anisotropic property is a core technology importantly regarded as one of major applied fields of chromonic liquid crystal compositions. The chromonic liquid crystal composition of the present invention is formed in the form of a solid film manufactured by being coated on a base film and being cured, which can be advantageously used as a polarizing plate, an optical compensation film, a phase difference retardation film, an alignment film, or a color filter.

According to the present invention, since a monomer included in the composition has high aggregation stability in its molecular aggregate unit, an optical device having excellent mechanical, optical and electrical characteristics may be obtained as the result of performing "polymerization based curing," such as photo polymerization or thermal polymerization, on the monomer of the composition, without drying for removing water contained in an aqueous solution. Technical features of the present invention will now be described.

(1) Coating

The composition comprising chromonic liquid crystal compounds and monomers each having opposing acid-base properties used as main materials, and a photoinitiator and/or a thermal initiator as the polymerization initiator were mixed and coated on a base film.

Here, lyotropic chromonic liquid crystals having new functional groups are generated by interaction between a cation (or anion) of a basic (or acidic) group surrounding an aromatic hydrophobic core of the chromonic liquid crystal compound, and an anion (or cation) of an acidic (or basic) monomer as a counter-ion of the cation (or anion). When the composition is cured, cohesiveness between molecular aggregates of a liquid crystal dye and cohesiveness between the molecular aggregate and the base film can be enhanced by polymerization of the new functional groups. Accordingly, excellent mechanical, optical and electrical characteristics of the formed film can be achieved. In addition, in a case where the composition is cured by photo polymerization using UV light, the composition may be formed by adding a photoinitiator. In a case where the composition is cured by thermal polymerization, the composition may be formed by adding a thermal initiator. Alternatively, the photoinitiator and the thermal initiator may be used in combination.

In the coating, suitable examples of the coating may include spin coating, dip coating, flow coating, spray coating, roll coating, gravure coating, and micro-gravure coating.

Glass or mica, or an anisotropic film such as triacetylcellulose (TAC) may be used as the base film. Non-limiting examples of a hydrophobic transparent resin film may include general transparent resins exemplified by polyester polymers such as polyethyleneterephthalate (PET), or polyethylene naphthalate; acryl-based polymers such as polymethylmethacrylate (PMMA); and styrene polymers such as polystyrene and acrylonitrile-styrene copolymer; polycarbonate polymers.

(2) Aligning

A coating film including thelyotropic chromonic liquid crystal composition is aligned or oriented in a predetermined direction.

Here, the aligning may be performed by various known methods using, for example, a strong magnetic field, an alignment film, or a shear force.

One simplest way of aligning methods is to treat a surface of the base film by rubbing, or to form an alignment film through photo alignment of a polymer having a photo active group, such as azobenzene.

In addition, a liquid crystal cell using chromonic liquid crystals may be used as a retardation film with negative birefringence in a planar N phase or a twisted chiral nematic (N*) phase, as disclosed in [M. Lavrentovich, T. Sergan and J. Kelly, Liq. Cryst., 2003, 30, 851]. In the disclosed technology, a planar N-phase liquid crystal cell is provided using two glass substrates having rubbed polyimide coated thereon as alignment films, and then filled with the composition.

Alternatively, a non-ionic polymer coating film having an azobenzene group may be treated with linear polarization to form an alignment film, and the chromonic liquid crystal composition may be coated thereon.

In a shear-induced aligning method, a composition in a lyotropic liquid crystal phase is coated on a base film, and a shear force is induced onto the composition coating film, thereby aligning chromonic liquid crystal molecules such that the axes thereof are perpendicular to a shear-induced direction.

(3) Curing

After the liquid crystal molecules are aligned, they are cured by photo polymerization or thermal polymerization. In a case where curing is performed by photo polymerization, the composition including the photoinitiator is coated and aligned, followed by curing at room temperature with UV irradiation or by cold curing. In a case where curing is performed by thermal polymerization, the composition including the thermal initiator is coated and aligned, followed by exposing the composition to high temperature exceeding 100° C. for 10 minutes to 10 hours. The photo polymerization or the thermal polymerization are not limited to the methods stated above and any method may be used as long as a monomer is generally polymerized and cured.

As described above, if the lyotropic chromonic liquid crystal composition includes a combination of an acidic chromonic liquid crystal compound, a basic monomer and a polymerization initiator, the composition further including water in addition to the combination is more preferably used. In this case, the acidic chromonic liquid crystal compound is dispersed in a water-soluble basic monomer by means of water during the coating. Preferably, drying the composition for removing water is further provided after the coating.

FIG. 6 illustrates an embodiment of the present invention of a structure of a unit molecular aggregate formed after performing polymerization using a chromonic liquid crystal composition including a molecule represented by the formula (VII-3), obtained by mixing and reacting a basic chromonic liquid crystal compound represented by the formula (VII-1), i.e., perylenedicarboxyimide, (to be denoted by reference numeral "10" hereinafter) and an arbitrary acrylic acid having an acryl group represented by the formula (VII-2), (to be denoted by reference numeral "20" hereinafter) as an acidic monomer:

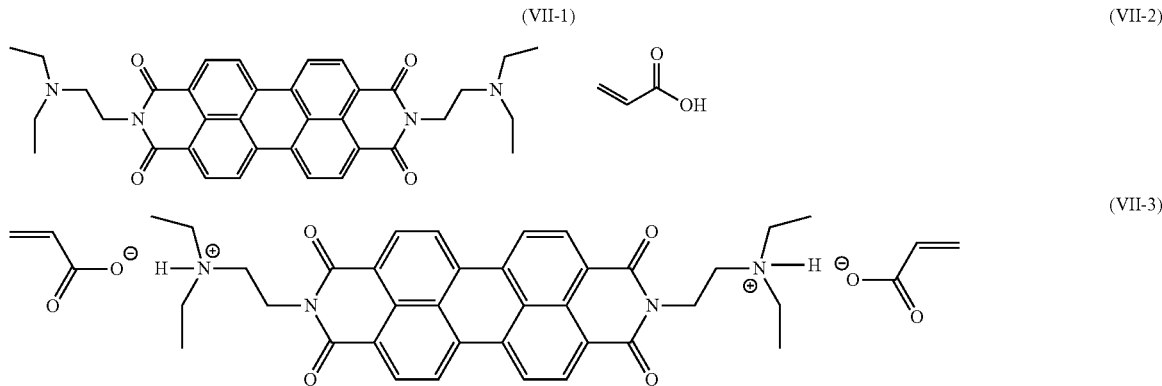

If the basic chromonic liquid crystal compound 10 and acrylic acid 20 as the acidic monomer are mixed to cause a reaction therebetween, the disk-shaped molecules of the basic chromonic liquid crystal compound 10 and the acrylic acid 20 are bonded in forms of salts by an acid-base reaction, as represented by the formula (VII-3), and then dissolved in excess acrylic acid 20, so that the reaction product may have a lyotropic liquid crystal phase and chromonic liquid crystal molecules are stacked by self-organization, followed by thermal polymerization or photo polymerization, to allow the chromonic liquid crystal molecules to be polymerized with the acrylic acid 20 bonded to a hydrophobic core of the chromonic liquid crystal compound 10 and external acrylic acid 20 that is not bonded to the hydrophobic core, thereby forming a strong bond structure 20' between molecular aggregate layers.

FIG. 7 illustrates a polarizing film formed by the composition shown in FIG. 6. That is to say, the bond structure 20' having acrylic acid polymerized with the chromonic liquid crystal molecules 10 is self-organized and aligned on a base film 100.

The thus formed liquid crystal film may be used as an optical film. Specifically, a micropattern polarizing element has been recently proposed and researched, and an embodiment of the micropattern polarizing element will now be briefly described.

Research into a micropattern made of an anisotropic aromatic material is being conducted based on self-organization characteristics of chromonic liquid crystals. The micropattern polarizing element manufactured using the micropattern can be applied to various fields including a holographic film using an optical material by which images vary according to the viewing angle, microelectronics, 3D image displays, and so on.

FIG. 8 sequentially illustrates an embodiment of a method for manufacturing a micropattern polarizing device. As illustrated in FIG. 8, the method for manufacturing a micropattern polarizing device includes: (a) a liquid crystal composition 200 including a photoinitiator according to the present invention is coated on a base film 100 by the shear-induced aligning method such that liquid crystals are aligned in a predetermined direction; (b) a photo mask 300 having a pattern is positioned on the liquid crystal composition 200; (c) irradiating UV light to selectively cure the that liquid crystal composition 200; and (d) removing the photo mask 300.

After the selectively curing is completed, a non-exposed portion, excluding the exposed and cured portion, may be removed by transforming the non-exposed portion into an isotropic portion, thereby performing additional process (i.e., developing) to manufacture the micropattern polarizing element. The transforming of the non-exposed portion into the isotropic portion may be achieved in the following manner. Since the non-exposed portion is not cured, it may be selectively removed using a developing solution having solubility. Alternatively, the non-exposed portion may be transformed into an isotropic portion using heat or a concentration change due to evaporation of acidic monomer, followed by irradiating UV light all over the residual film. As a result, the exposed portion has an aligned liquid crystal phase, and the non-exposed portion is in an isotropic state.

Advantageous Effects of Invention

According to the present invention, optical film having excellent electrical and optical properties, including mechanical strength, an insulating characteristic and a refractive index, can be obtained using a lyotropic chromonic liquid crystal composition including chromonic liquid crystal compounds and monomers each having opposing acid-base properties, based on curing by thermal polymerization or photo polymerization, rather than drying.

BEST EMBODIMENTS FOR CARRYING OUT THE PRESENT INVENTION

Hereinafter, methods for manufacturing a lyotropic chromonic liquid crystal coating film according to the present invention will now be described in more detail with reference to the following examples and comparative examples.

EXAMPLE 1

0.05 g of Red 2304 (manufactured by Optiva) as a basic chromonic liquid crystal compound, represented by the formula (I-10), 0.01 ml of 2-carboxyethyl acrylate as an acidic monomer, represented by the formula (III-3), and 0.0025 g of Irgacure 907 (manufactured by Ciba) as a photoinitiator were mixed and coated on a glass substrate by spin coating. The coating film was rubbed in a lengthwise direction using a rubber plate, and light of 20 mJ/cm$^2$ was irradiated into the rubbed coating film using a metal halogen lamp to cure the liquid crystal coating film, thereby obtaining a 2 μm thick liquid crystal coating film.

COMPARATIVE EXAMPLE 1

A liquid crystal coating film was formed in the same manner as in Example 1, except that water, instead of acidic monomer, was mixed with the composition to form an aqueous composition. The liquid crystal coating films manufactured in Examples and Comparative Examples were rubbed using a pen.

EXAMPLE 2

0.05 g of Violet 20 (manufactured by Optiva) as an acidic chromonic liquid crystal compound, represented by the formula (II-12), 0.1 ml of dimethylaminoethyl acrylate (DMAEA) as a basic monomer, represented by the formula (IV-6), and 0.5 ml of water were homogenously mixed to give a mixed solution, moisture was removed at room temperature under vacuum, and 0.0025 g of Irgacure 907 (manufactured by Ciba) as a photoinitiator was added and mixed with the resultant product and coated on a glass substrate by spin coating. Thereafter, the coating film was rubbed in a lengthwise direction using a rod, and light of 20 mJ/cm$^2$ was irradiated into the rubbed coating film using a metal halogen lamp to cure the liquid crystal coating film, thereby obtaining a 2 μm thick liquid crystal coating film.

COMPARATIVE EXAMPLE 2

A liquid crystal coating film was formed in the same manner as in Example 2, except that water, instead of the basic monomer, was added to be mixed to form the composition in an aqueous solution.

Figure 1:
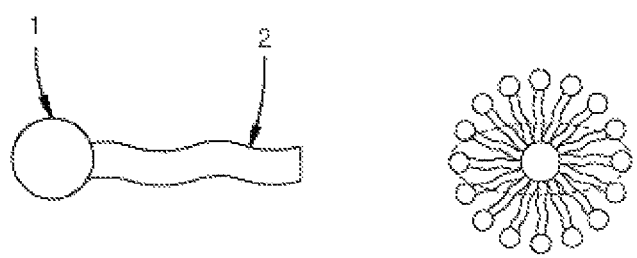
FIGS. 1 and 2 illustrate a molecular structure and a macro structure of an LCLC molecule.
Figure 2:
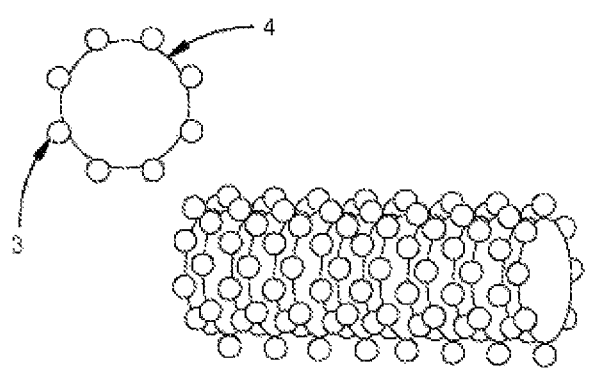
Figure 3:
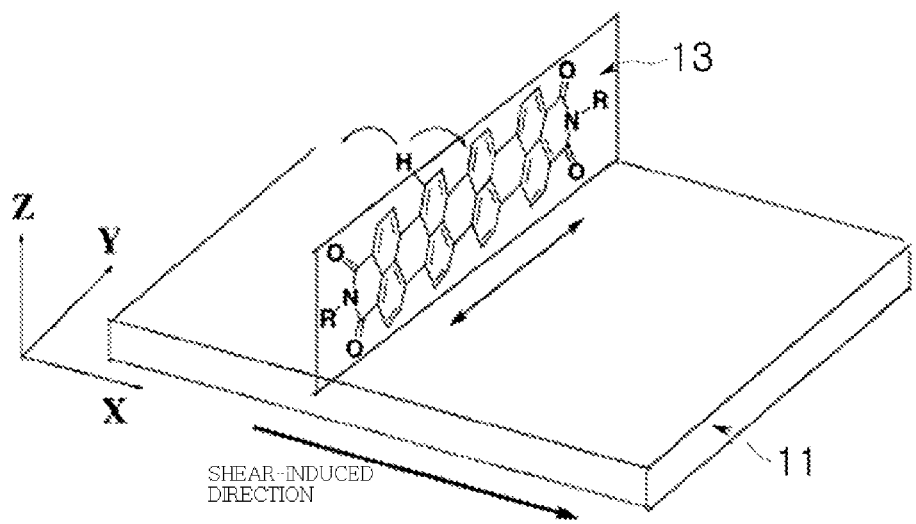
FIGS. 3 to 5 illustrate a molecular structure and a stacked structure of a liquid crystal layer formed by a method for manufacturing an optical device using the conventional LCLC.
Figure 4:
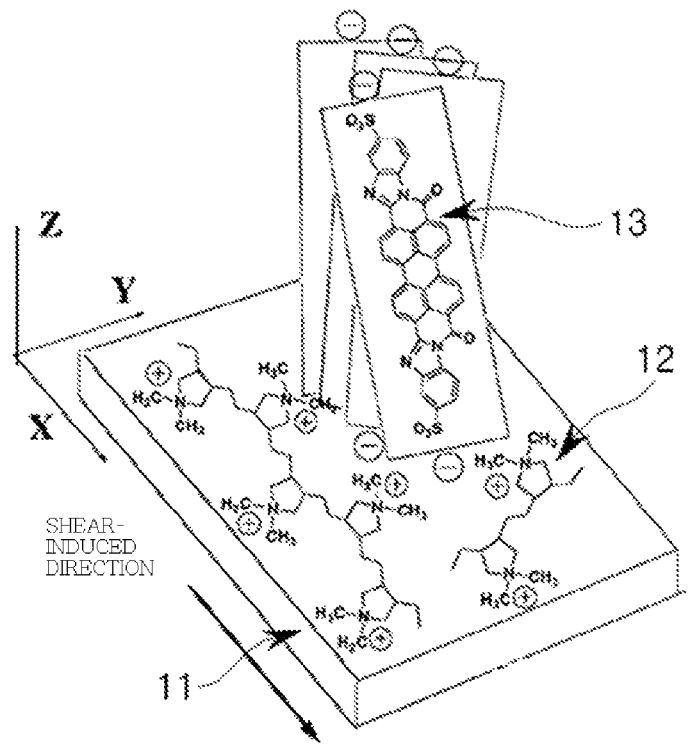
Figure 5:
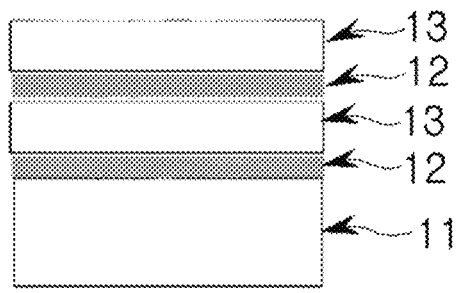
Figure 6:
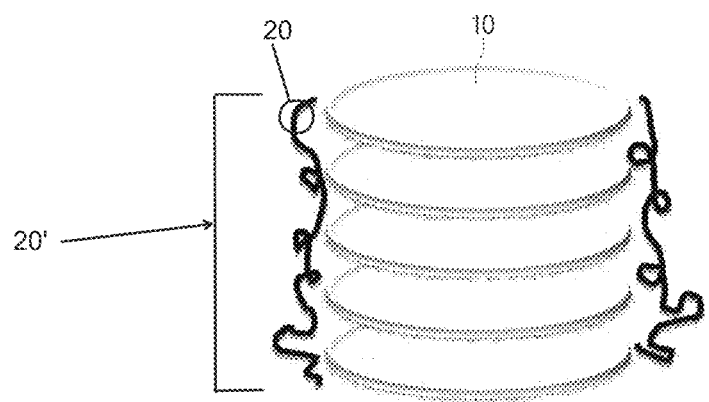
FIG. 6 illustrates a structure of a unit molecular aggregate formed after performing polymerization using a chromonic liquid crystal composition according to an embodiment of the present invention.
Figure 7:
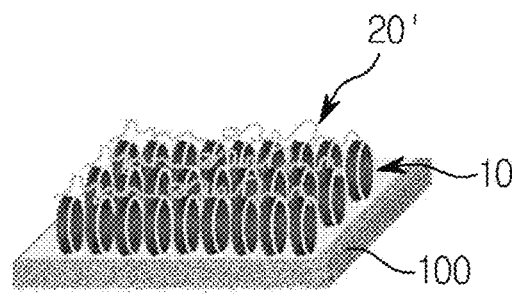
FIG. 7 illustrates a polarizing film formed by the composition shown in FIG. 6.
Figure 8:
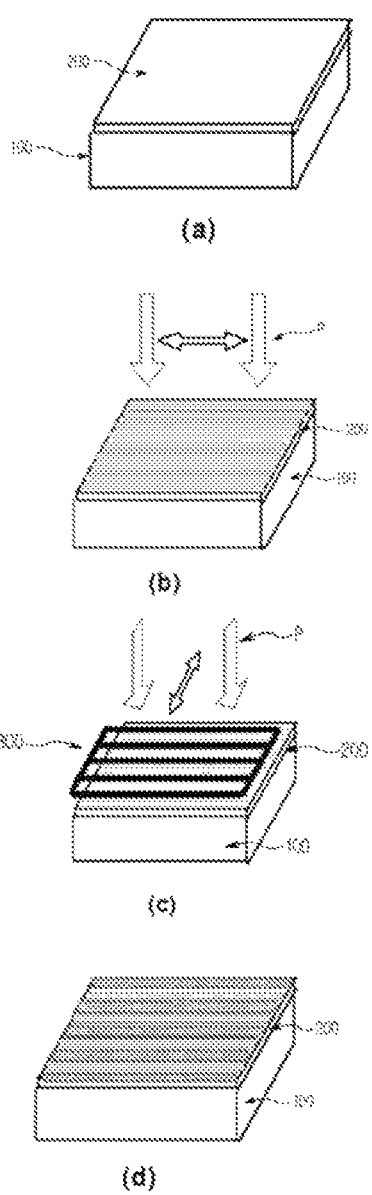
FIG. 8 sequentially illustrates an embodiment of a method for manufacturing a micropattern polarizing device.
Figure 9:
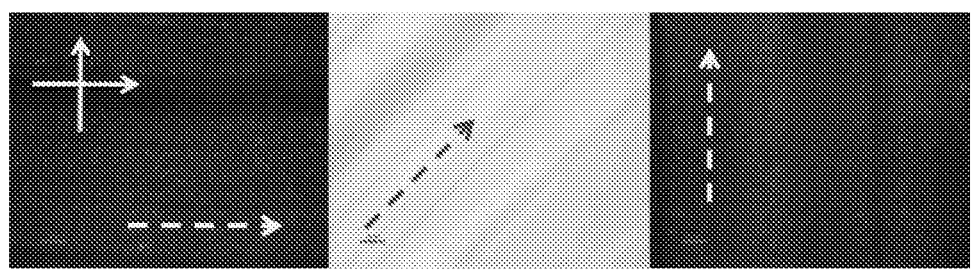
FIGS. 9 and 10 are optical microscope photographs of liquid crystal coating films formed in Examples 1 and 2.
Figure 10:

FIGS. 9 and 10 are optical microscope photographs of surfaces of liquid crystal coating films formed in Examples 1 and 2, illustrating polarization characteristics of the formed films observed by rotating polarization axis 0°, 45°, and 90° with respect to orthogonal polarization and allowing the orthogonal polarization to pass through the liquid crystal coating films. As illustrated in FIGS. 9 and 10, the liquid crystal coating films formed using the lyotropic chromonic liquid crystal composition according to the present invention exhibits highest transmittance when the polarization axis was rotated 45° and little light passed through the coating films at angles 0° and 90°, which is an optical characteristic demonstrated when an optical axis of a circular polarization film is 0°. Therefore, it is confirmed that the liquid crystal coating films formed using the lyotropic chromonic liquid crystal composition according to the present invention have excellent polarization characteristics.

The liquid crystal coating films formed in Examples 1 and 2 and Comparative Examples 1 and 2 are evaluated in the following manners.

(1) Coating Film Appearance

The liquid crystal coating films formed in Examples 1 and 2 and Comparative Examples 1 and 2 were photographed using a polarizing microscope.

Figure 11:
FIGS. 11 and 12 are optical microscope photographs of surfaces of liquid crystal coating films formed in Example and Comparative Example.
Figure 12:
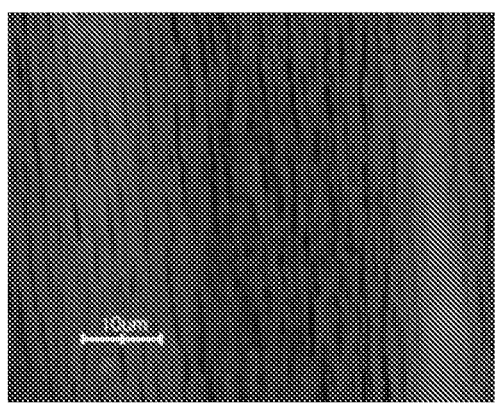

FIGS. 11 and 12 are optical microscope photographs of surfaces of liquid crystal coating films formed in Example and Comparative Example.

As illustrated in FIGS. 11 and 12, little surface cracks were observed from the liquid crystal coating film formed in Example 1. However, surface cracks (cracked black portions) were observed from some parts of the liquid crystal coating film formed in Comparative Example 1.

(2) Pencil Hardness

In accordance with ASTM D3502, hardness levels of the liquid crystal coating films formed in Examples 1 and 2 and Comparative Examples 1 and 2 were evaluated with pencils having different levels of hardness. Surface images of the formed liquid crystal coating films were observed using a polarizing microscope in such a manner that the polarization axis is rotated 45° and the results are set forth in FIGS. 13 and 14.

Figure 13:
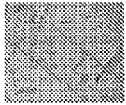
FIGS. 13 and 14 are polarizing microscope photographs of liquid crystal coating films formed in Examples 1 and 2 and Comparative Examples 1 and 2.
Figure 13:
Figure 13:
Figure 13:
Figure 13:
Figure 13:
Figure 13:
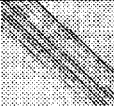
Figure 13:
Figure 13:
Figure 13:
Figure 14:
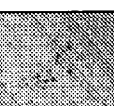
Figure 14:
Figure 14:
Figure 14:
Figure 14:
Figure 14:

Black pencil marks in the surface images shown in FIGS. 13 and 14 suggest that anisotropic states of the coating films are broken and the coating films are transformed to be in isotropic states. It is determined that pencil hardness at the time when pencil marks appear black is the critical point at which a polarizing plate loses its anisotropic property.

As shown in FIGS. 13 and 14, the surfaces of the liquid crystal coating films formed in Examples 1 and 2 turned black when degrees of pencil hardness were 3H and HB or higher, and the surfaces of the liquid crystal coating films formed in Comparative Examples 1 and 2 turned black when degrees of pencil hardness were 3B and 2B or higher. Therefore, it is confirmed that the liquid crystal coating film manufactured using the lyotropic chromonic liquid crystal composition has remarkably high surface hardness.

While the present invention has been described in detail with reference to the preferred experimental embodiments and comparative embodiments, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A lyotropic chromonic liquid crystal composition comprising a basic chromonic liquid crystal compound having a basic group, and an acidic monomer having an acidic group;

or an acidic chromonic liquid crystal compound having an acidic group, and a basic monomer having a basic group.

2. The lyotropic chromonic liquid crystal composition of claim 1, wherein the basic chromonic liquid crystal compound includes a hydrophobic core formed of aromatic molecules surrounded by basic groups, and the acidic chromonic liquid crystal compound includes a hydrophobic core formed of aromatic molecules surrounded by acidic groups.

3. The lyotropic chromonic liquid crystal composition of claim 1, wherein the basic chromonic liquid crystal compound or the acidic chromonic liquid crystal compound is in a range of 3 to 40 wt. % based on a total weight of the lyotropic chromonic liquid crystal composition.

4. The lyotropic chromonic liquid crystal composition of claim 1, wherein the basic groups of the basic chromonic liquid crystal compound and the basic monomer render nitrogen ion ($N^+$) when they react with the acidic monomer and the acidic chromonic liquid crystal compound, respectively.

5. The lyotropic chromonic liquid crystal composition of claim 1, wherein the acidic groups of the acidic chromonic liquid crystal compound and the acidic monomer render at least one of carboxylate ion ($COO^-$), phosphate ion ($PO_3^{31}$) and sulfonate ion ($SO_3^{31}$) when they react with the basic monomer and the basic chromonic liquid crystal compound, respectively.

6. The lyotropic chromonic liquid crystal composition of claim 1, further comprising a polymerization initiator including at least one of a photoinitiator and a thermal initiator.

7. The lyotropic chromonic liquid crystal composition of claim 6, wherein the polymerization initiator is in a range of 0.01 to 10 wt. % based on a total weight of the lyotropic chromonic liquid crystal composition.

8. The lyotropic chromonic liquid crystal composition of claim 1, further comprising at least one of:
at least one of the following additives: a non-ionic vinyl monomer, a crosslinking monomer, a leveling agent, a wetting agent, a UV stabilizer, a surfactant a thermal stabilizer, an anti-aging agent, a denaturant, a dispersant, a terminator, a curing agent, an antiozonant, an antioxidant, a plasticizer, a viscosity modifier, a coagulant, a dye, and a pigment; and
a solvent,
wherein a total weight of solvent and additive, whether one is present alone or in combination with the other, is within a range of 0.01 to 80 wt. % based on a total weight of the lyotropic chromonic liquid crystal composition.

9. A method for the manufacture of a lyotropic chromonic liquid crystal coating film, the method comprising:
coating the lyotropic chromonic liquid crystal composition of any one of claims 1 to 8 on a base film;
aligning a coating film containing the lyotropic chromonic liquid crystal composition; and
curing the coating film through thermal polymerization or photo polymerization.

10. The method of claim 9, wherein the lyotropic chromonic liquid crystal composition comprises an acidic chromonic liquid crystal compound, a basic monomer, a polymerization initiator and water, after the coating, further comprising drying to remove water.

11. The method of claim 9, wherein the curing comprises placing a photo mask on the coating film, selectively curing the coating film through UV radiation, and removing the photo mask, after the curing, further comprising secondary curing through UV radiation by removing an uncured portion of the coating film that is not cured in the curing or treating the uncured portion so as to be in an optically anisotropic phase by heat treatment or evaporation.

12. The method of claim 9, wherein the aligning of the lyotropic chromonic liquid crystal coating film is performed by one of a ferroelectric field based aligning method, an alignment film based aligning method, and a shear-induced aligning method.

13. A lyotropic chromonic liquid crystal coating film manufactured by the method of claim 9.

14. The lyotropic chromonic liquid crystal composition of claim 8, wherein the non-ionic vinyl monomer comprises one of the following water-insoluble non-ionic vinyl monomers: $C_1$-$C_{30}$ alkyl (meth)acrylate; $C_1$-$C_{30}$ alkyl (meth)acrylamide; styrene; substituted styrenes comprising vinyl toluene, butyl styrene, isopropyl styrene, and p-chlorostyrene; vinyl esters comprising vinyl acetate, vinyl butyrate, vinyl caprolate, vinyl pivalate, and vinyl neodecanoate; unsaturated nitriles including methacrylonitrile, and acrylonitrile; unsaturated silanes including trimethylvinyl silane, dimethylethylvinyl silane, allyldimethylphenylsilane, allyltrimethylsilane, 3-acrylamidopropyltrimethylsilane, and 3-trimethylsilylpropyl methacrylate.

15. The lyotropic chromonic liquid crystal composition of claim 8, wherein the non-ionic vinyl monomer comprises one of the following water-soluble non-ionic vinyl monomers: $C_2$-$C_6$ hydroxyalkyl(meth)acrylate; glycerol mono(meth)acrylate; tris(hydroxymethyl)ethane mono(meth)acrylate; pentaerythritol mono(meth)acrylate; N-hydroxymethyl (meth)acrylamide; 2-hydroxyethyl (meth)acrylamide; 3-hydroxypropyl (meth)acrylamide; (meth)acrylamide; N-vinyl caprolactam; N-vinyl pyrrolidone; methacrylamidoethyl-N-ethylene urea (i.e., $CH_2$=$C(CH_3)C(O)NH\ CH_2CH_2$-N-ethylene urea); C1-C4 alkoxy substituted (meth)acrylate; (meth)acrylamide including methoxyethyl (meth)acrylate, 2-(2-ethoxyethoxy)ethyl (meth)acrylate; and $C_1$-$C_{18}$ alkyl ester of acrylic acid or methacrylic acid; methacrylamidoethyl-N-ethylene urea.

16. The lyotropic chromonic liquid crystal composition of claim 8, wherein the crosslinking monomer comprises one of the following: diamine-based monomer; acryl-based multifunctional monomer; epoxy-based crosslinking agent; metal chelate crosslinking agent; silane-based crosslinking agent; aldehyde; N-methylol compound; dioxane derivative; a carboxyl group activation compound; activated vinyl compound; activated halogen compound; isoxazole; and dialdehyde starch.

17. The lyotropic chromonic liquid crystal composition of claim 8, wherein the anti-aging agent comprises one of: a phenol-based compound; an amine-based compound; an organic sulfur based compound; and a phosphine based compound.

18. The lyotropic chromonic liquid crystal composition of claim 8, wherein the denaturant comprises one of: a glycol; a silicon; and an alcohol.

19. The lyotropic chromonic liquid crystal composition of claim 8, wherein the surfactant comprises one of: a silicon-based surfactant; an acryl-based surfactant; a fluorine-based surfactant; and, a conductive surfactant comprising quaternary ammonium.

20. The lyotropic chromonic liquid crystal composition of claim 8, wherein the solvent comprises one of: water; an organic solvent comprising alcohols, acetates, ethers, glycols, ketones, and carbonates; and a non-protogenic, polar organic solvent comprising dimethylformaldehyde (DMF), dimethylsulfoxide (DMSO), N-methylpyrrolidone (NMP), or N,N-dimethylacetamide (DMAc).

* * * * *